(12) United States Patent
Tamaki et al.

(10) Patent No.: US 7,212,830 B2
(45) Date of Patent: May 1, 2007

(54) POSITION DETECTION METHOD, POSITION DETECTION SYSTEM, AND POSITION DETECTION SERVER EQUIPMENT

(75) Inventors: Tsuyoshi Tamaki, Hachioji (JP); Naoto Matsuzawa, Kawaguchi (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 11/046,745

(22) Filed: Feb. 1, 2005

(65) Prior Publication Data

US 2005/0266860 A1 Dec. 1, 2005

(30) Foreign Application Priority Data

May 21, 2004 (JP) .............................. 2004-151179

(51) Int. Cl.
*H04Q 7/20* (2006.01)
(52) U.S. Cl. .............................. 455/456.1; 342/357.08
(58) Field of Classification Search .. 455/456.1–456.6, 455/422.1, 403; 342/357.08
See application file for complete search history.

(56) References Cited

U.S. PATENT DOCUMENTS

| | | | | |
|---|---|---|---|---|
| 5,043,903 | A | * | 8/1991 | Constant ..................... 701/300 |
| 6,002,360 | A | * | 12/1999 | Wolcott et al. ............. 342/354 |
| 6,271,768 | B1 | * | 8/2001 | Frazier et al. .............. 340/961 |
| 2003/0119559 | A1 | * | 6/2003 | Chitrapu ..................... 455/562 |
| 2004/0057409 | A1 | * | 3/2004 | Kennedy ..................... 370/338 |

FOREIGN PATENT DOCUMENTS

| | | |
|---|---|---|
| JP | 07-181242 | 12/1993 |
| JP | 2004-101254 | 9/2002 |

* cited by examiner

*Primary Examiner*—Nick Corsaro
*Assistant Examiner*—Michael Faragalla
(74) *Attorney, Agent, or Firm*—Reed Smith LLP; Stanley P. Fisher, Esq.; Juan Carlos A. Marquez, Esq.

(57) ABSTRACT

A position detection method employed in a position detection system for detecting the position of a terminal of a radio communication system is provided which determines propagation times of a signal between the terminal and a plurality of access points located around the terminal by the principle of trilateration, thus permitting reduction in position detection time. The invention comprises means for determining a movement velocity of the terminal from a temporal history of positional information about the terminal obtained by position detection with the trilateration, means for grouping the terminals with low relative velocities based on the terminal movement velocities, a control database including the terminal position information, the terminal movement velocities, and the group information as components, and means for determining a detection cycle of the terminal of interest for position detection using the control database. A representative terminal of the terminals grouped is subjected to a position detection procedure by sending a transmit signal for the position detection, while the terminal other than the representative terminal of the group has its position estimated by its relative velocity, thereby permitting reduction in the position detection time per terminal.

16 Claims, 14 Drawing Sheets

PROCESSING OF POSITION CALCULATION PROCESSING UNIT 104

$$D_i - D_2 = c \times \underline{(T_i - T_2)} \quad (i = 3, 4)$$

DATA FOR POSITION MEASUREMENT 106

$$D_i = \sqrt{(X_i - X)^2 + (Y_i - Y)^2 + (Z_i - Z)^2}$$

c: VELOCITY OF LIGHT

FIG.8
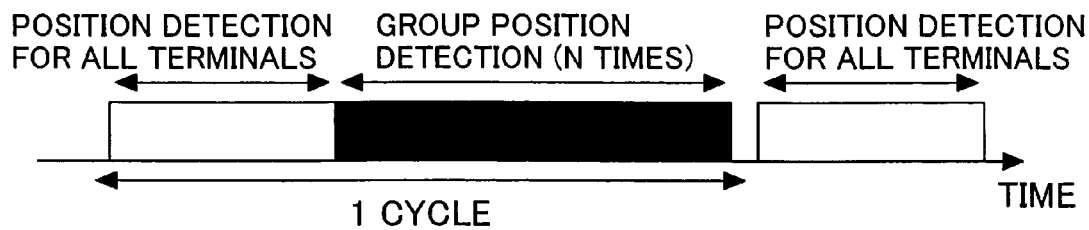
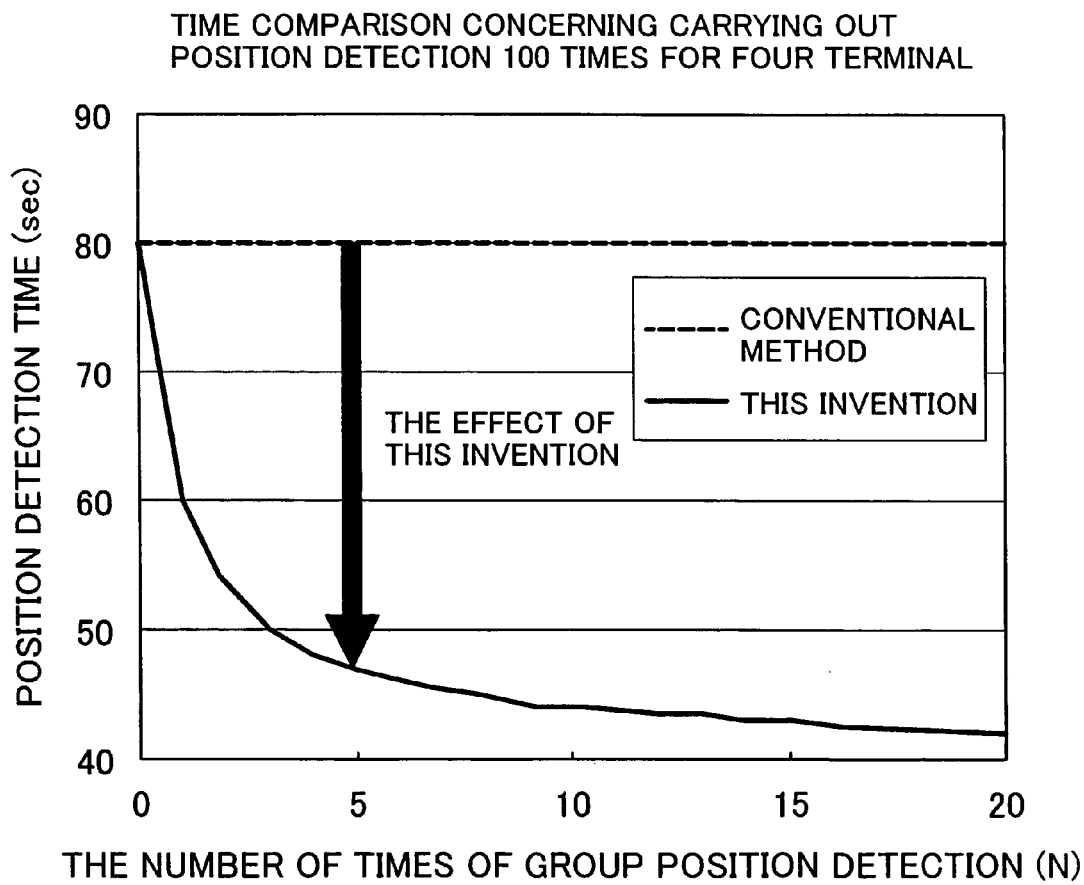
THE CASE WHEN THREE OF THE FOUR THE TERMINALS CAN BE REGARDED AS A GROUP

STRUCTURE OF CONTROL DATA 107

FIG.13

HOW TO DETERMINE THE NUMBER OF TIMES
OF GROUP POSITION DETECTION 1006

THE NUMBER OF TIMES OF GROUP POSITION DETECTION (N)
= $f(v2\_j)$ i.e $f(v2\_j) = [k/v2\_j]$ $v2\_j$ : THE SECOND POWER SUM OF RELATIVE
　　　　　　　VELOCITY OF THE GROUP CENTER TERMINAL j
　　　　$k$ 　: CONSTANT
　　　　$[x]$ : THE INTEGER VALUE NOT EXCEEDING x

TABLE WHICH DETERMINE THE NUMBER OF
TIMES OF GROUP POSITION DETECTION　　1301

| THE SECOND POWER SUM OF RELATIVE VELOCITY OF THE GROUP CENTER TERMINAL j $v2\_j$ | THE NUMBER OF TIMES OF GROUP POSITION DETECTION (N) |
|---|---|
| LARGE ↑　x6 ~ x7 | SMALL ↓　0 |
| x5 ~ x6 | 1n |
| x4 ~ x5 | 2n |
| x3 ~ x4 | 3n |
| x1 ~ x2 | 4n |
| SMALL　0 ~ x1 | LARGE ↓　5n |

POSITION DETECTION METHOD, POSITION DETECTION SYSTEM, AND POSITION DETECTION SERVER EQUIPMENT

CLAIM OF PRIORITY

The present application claims priority from Japanese application JP 2004-151179 filed on May 21, 2004, the content of which is hereby incorporated by reference into this application.

FIELD OF THE INVENTION

The present invention relates to radio communication systems that achieve position detection of a mobile or fixed terminal, and to position detection methods using same. More particularly, the invention is directed to a position detection method that permits reduction in time required for the position detection, to a position detection system using same, and to a position detection server therein.

BACKGROUND OF THE INVENTION

A conventional position detection method typically involves measuring a position of an object using signals transmitted from a satellite, such as a GPS.

Another known position detection method involves receiving signals transmitted from a plurality of access points at a terminal, and calculating the position of the terminal from differences in times of reception of the signals.

More specifically, a method for detecting the position of a mobile terminal in a cellular phone system has been proposed which includes calculating the differences in the reception times of signals transmitted from the access points to the mobile terminal (e.g. differences in propagation times of the signals from the respective access points to the mobile terminal $T1-T2$ and $T3-T2$), and multiplying the propagation time differences by light velocity to calculate differences in propagation distances of the signals from the mobile terminal to the respective access points, thereby determining the position of the terminal, in the following manner (see patent document 1).

$$D1-D2=c(T1-T2)$$

$$D3-D2=c(T3-T2)$$

Another method for detecting a position of a node in a wireless LAN system has been proposed which includes calculating differences in reception times of a signal (differences between the reception times at the respective access points $Ti-T1$), which has been transmitted from the node (terminal) and received at the access points, and multiplying the reception time differences by light velocity to calculate differences between propagation distances of the signal from the node to the respective access points ($\{[P-Pi]-[P-P1]\}=c(Ti-T1)$, $i=2, \ldots, n$), thereby detecting or determining the position of the node, in the following manner (see patent document 2).

[Patent document 1] JP-A No. 181242/1995
[Patent document 2] JP-A No. 101254/2004

SUMMARY OF THE INVENTION

The present invention has been accomplished in view of the above-mentioned prior art, and it is an object of the invention to provide a radio system that permits reduction in time needed for position detection, while remaining the accuracy of position detection in a radio communication system, server equipment, an access point, and a terminal, all of which constitutes the system, and a position detection method for detecting the position of the terminal in the system.

To solve the forgoing problems encountered with the prior art and to achieve the object, the invention provides a position detection method which comprises grouping a plurality of terminals with low relative velocities therebetween, performing a position measurement procedure by sending a transmit signal for the position detection to a representative terminal of the plurality of terminals grouped, and estimating the position of the terminal other than the representative terminal using its relative velocity, thereby permitting reduction in the time needed for the position detection per terminal.

According to the invention, in a system for detecting the positions of a number of terminals, only a single signal for the position detection of a representative terminal of a group is transmitted. Thus, in the detection system of the invention, the larger the number of terminals belonging to the group, the more the time needed for the entire position detection is reduced in comparison with the conventional method for position detection of the terminals, because the conventional method comprises transmitting signals for the position detection one by one to the respective terminals. Accordingly, the position detection system of the invention enables reduction in the time per terminal detection.

Particularly, in the case of carrying out the position detection of terminals owned by a great number of users standing in line and waiting so as to enter an event hall, the plurality of terminals are regularly moved, and hence differences in relative velocities therebetween are small, so that these terminals can be grouped together. The system of the invention enables reduction in the position detection time.

When the relative velocities between the plurality of terminals are found to be zero in advance, only the detection of the position of the representative terminal of the group may be carried out, while the positions of the remaining other terminals may be estimated based on relationships between the relative positions.

In addition, when the relative velocities are previously determined to be zero, the position detection procedure of the terminals other than the representative terminal may be regularly performed, and then the position of the representative terminal may be estimated using the relative positional relationship from positional information obtained. Thereafter, averaging of the estimated position and the position of the representative terminal detected by the position detection procedure can improve the detection accuracy of the representative terminal.

BRIEF DESCRIPTION OF THE DRAWINGS

FIG. 8 is an explanatory diagram of effects of the present embodiment;

FIG. 13 is an explanatory diagram showing a method for determining the number of times of the group position detection performed by the server according to the present embodiment.

DETAILED DESCRIPTION OF THE PREFERRED EMBODIMENTS

Some preferred embodiments of the present invention will be described hereinafter with reference to the accompanying drawings.

Figure 1:
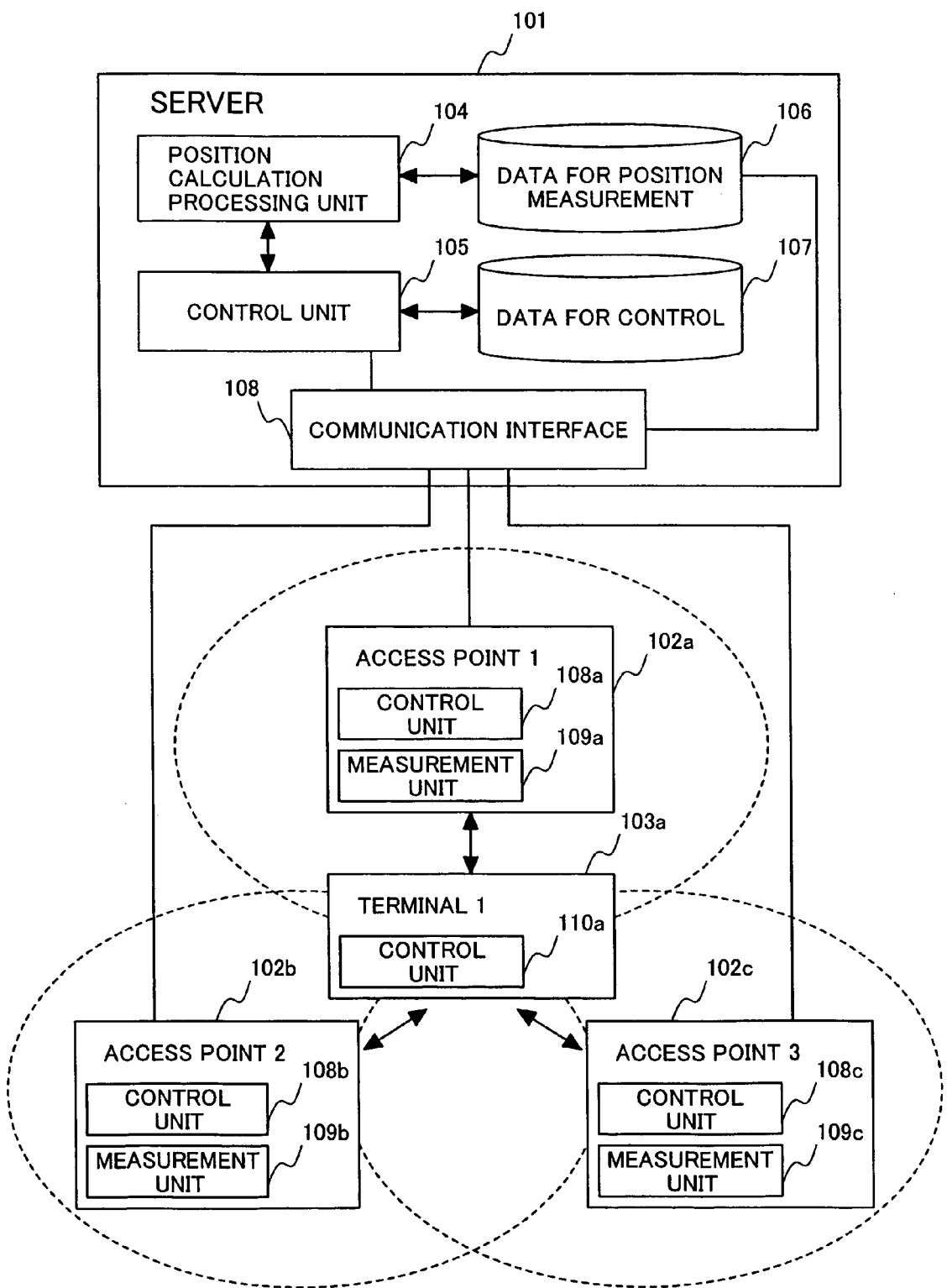
FIG. 1 is a configuration diagram showing a radio communication system and a system for position detection of terminals according to the present invention.

FIG. 1 shows a configuration diagram of a radio communication system and a system for position detection of terminals according to the invention.

The radio communication system includes a terminal 103a having a control part 110a for making a response to a signal for position detection, measurement parts 109a, 109b, and 109c each for receiving a response signal serving as position measurement data from the terminal 103a, a plurality of access points 102a, 102b, and 102c having control parts 108a, 108b, and 108c for performing control operations for the position detection, and a server 101. The server 101 includes a position measurement database 106 for collecting and storing therein information measured for the purpose of calculation of the position of the terminal 103a, and a control database 107 for storing therein information intended to determine the frequency of calculation of the position of the terminal 103a. The server further includes a position calculation processing part 104 which stores in its storage unit software for carrying out position measurement of a representative terminal (and a normal position measurement method of a terminal not belonging to a group), position detection, determination of a group composition, determination of the number of group position detection procedures, or the like, and which calculates the position of the terminal from data stored in the position measurement database 106. In addition, the server includes a controller 105 for determining the frequency of the position detection using data stored in the control database 107 and for executing position-detection control operations of the control parts on the access point side 108a, 108b, and 108c, and of a terminal control part 110a, based on the software stored in the storage unit. A communication interface 108 is further provided in the server for receiving the measurement data from the access point and for transmitting control information for measurement (notice of measurement preparation, an object to be measured, or the like).

It should be, however, noted that the position measurement database 106, the control database 107, and the position calculation processing part 104 of the server 101 may not necessarily be included in the server 101. That is, they may be included in another system installed in any one of the terminal 103 and the access points 102a, 102b, and 102c. The access point is operable to conduct radio communications with the terminal, and is, for example, a wireless LAN (Local Area Network), a cellular communication, a GPS satellite, or the like.

In the radio communication system according to the invention, a plurality of terminals are grouped together when performing position detection of the terminals, as described later, and then only the representative terminal of the group is subjected to a position measurement control operation, while the terminal other than the representative terminal has its position altered or corrected based on its relative position, thereby permitting reduction in time needed for the position detection.

Figure 2:
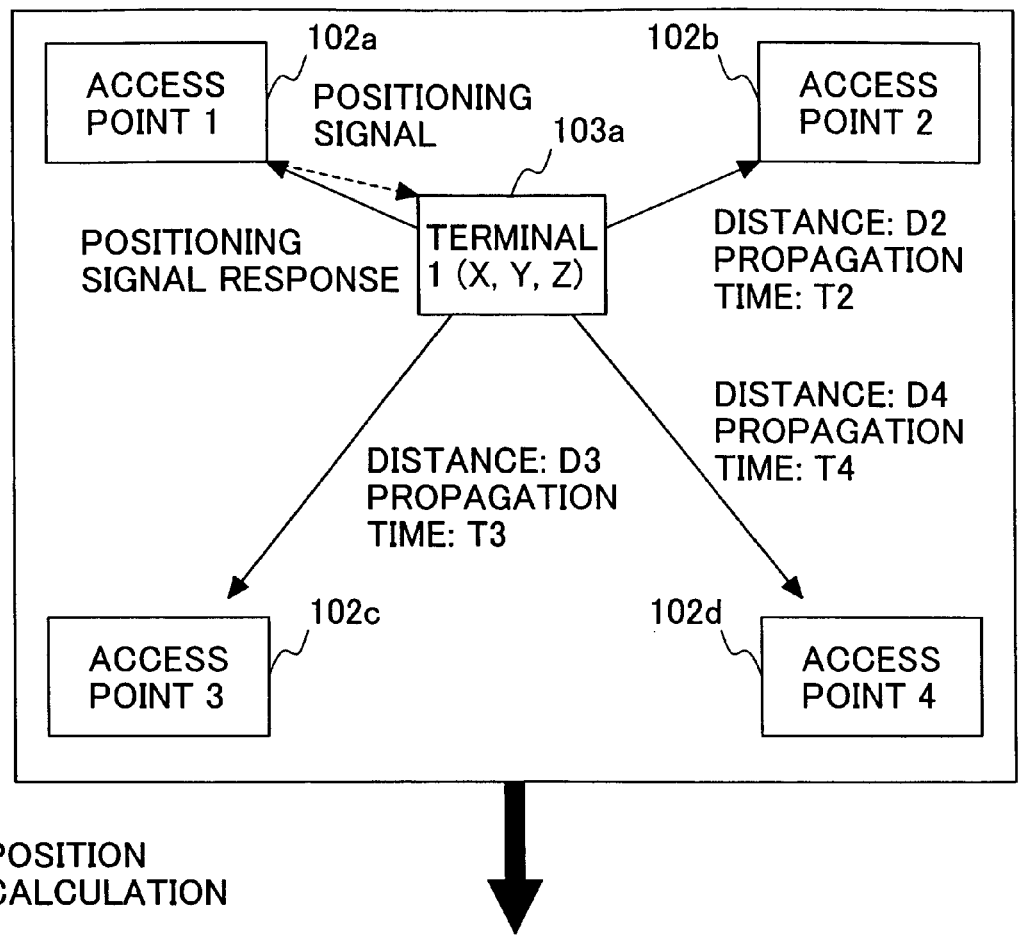
FIG. 2 is an explanatory diagram of the principle of a position calculation method.

FIG. 2 illustrates an explanatory diagram of the principle of a position calculation method carried out by the position calculation processing part 104. When the terminal 103a receives a positioning signal transmitted from the access point 102a, the terminal 103a sends a positioning signal response to the access point 102a. If the propagation times or arrival times of the positioning signal response transmitted from the terminal 103a can be measured at the respective access points 102b and 102c with their watches synchronized with each other, wherein a propagation time required for the response to propagate from the terminal 103a to the access point 102b is set as T2, and a propagation time required for the response to propagate from the terminal 103a to the access point 102c is set as T3, a difference in the propagation times of the response is determined to be a time difference T3−T2. The following equation (1) will be obtained, where D2 represents a distance from the terminal 103a to the access point 102b, and D3 represents a distance from the terminal 103a to the access point 102c.

$$D3-D2=c\times(T3-T2) \quad (1)$$

Likewise, the following equation (2) will be obtained regarding the access points 102c and 102d.

$$D4-D2=c\times(T4-T2) \quad (2)$$

A distance Di between the access point i and the terminal will be determined by the following equation (3), where X, Y, and Z represent the coordinates of the terminal, and Xi, Yi, and Zi represent the coordinates of the access point i.

$$Di=[(Xi-X)^2+(Yi-Y)^2+(Zi-Z)^2]^{1/2} \quad (3)$$

Therefore, substituting the equation (3) into the equations (1) and (2), and solving the thus-obtained simultaneous equations can determine the coordinates X, Y, and Z of the terminal 103a.

Figure 3:
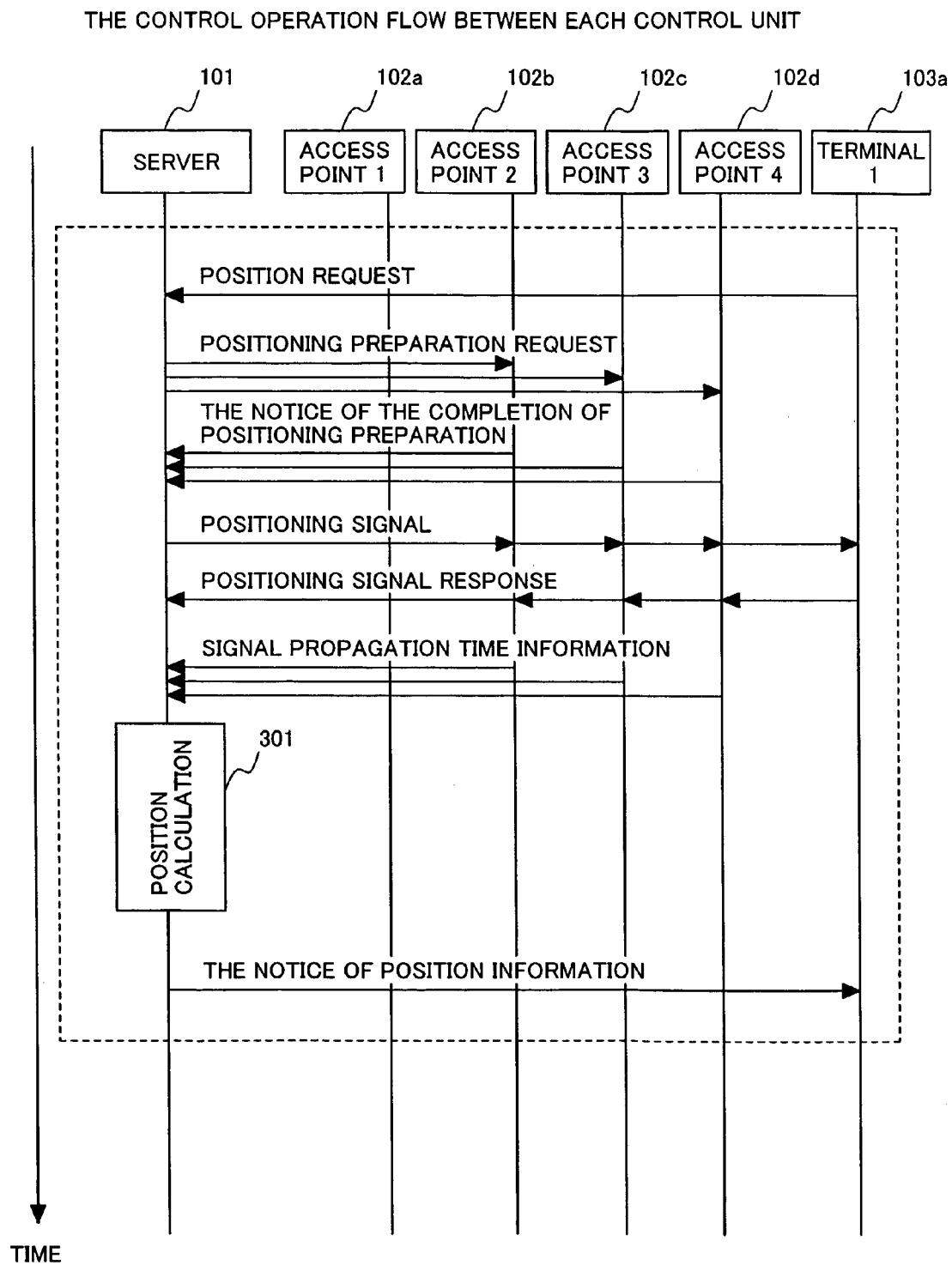
FIG. 3 is a control flow diagram of a position detection method.

FIG. 3 is a flow diagram of position measurement control operations, illustrating the flow of control signals transmitted and received between control components for the server 101, the access points 102a, 102b, and 102c, and the terminal 103a. In the description below, the terminal 103a communicates with the server 101 via the access point 102a (hereinafter referred to as "reference access point"), and a signal transmitted/received between the terminal 103a and the reference access point 102a is received at the access points 102b, 102c, and 102d (hereinafter referred to as "measurement access point") to measure the reception timing of the signal at each of the measurement access points. When the server 101 receives a position request from the terminal 103a, the server 101 transmits control signals indicative of the positioning preparation requests and including information about a frequency channel of the reference access point 102a, which establishes communications with the terminal 103a, to the measurement access points 102b, 102c, and 102d located near the terminal.

Upon receiving the positioning preparation requests, the measurement access points 102b, 102c, and 102d switches their frequency channels to the frequency channel described in the requests, and gives the notice of completion of the positioning preparation to the server 101 when they are in a condition of being capable of receiving the positioning signal and the positioning preparation request.

Upon receiving the completion notices of the positioning preparation from all measurement access points 102b, 102c, and 102d of interest, the server 101 transmits the positioning signal to the terminal 103a. When receiving the positioning signal, the terminal 103a sends the positioning signal response to the server 101. After receiving the positioning signal and the positioning-signal response signal, the measurement access points 102b, 102c, and 102d located around the terminal 103a notify the server of the time of reception of the signal and of the received signal as signal propagation time information.

The server 101 calculates and determines the terminal position by solving the simultaneous equations composed of the above-mentioned equations (1) to (3). The thus-obtained coordinates are informed the terminal 103a as the positional information notice.

Figure 4:
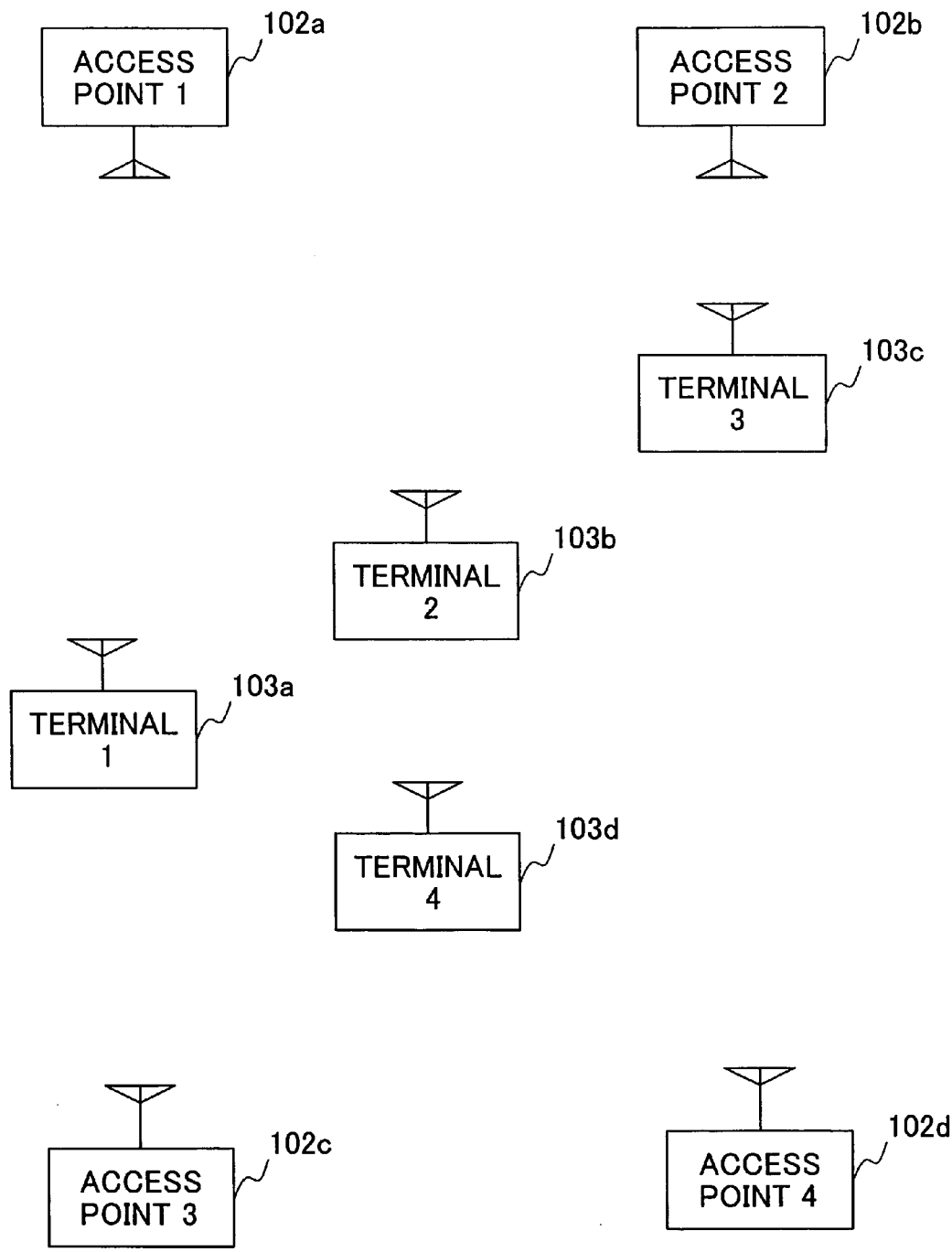
FIG. 4 is a configuration diagram of a system employed in the position detection of a plurality of terminals.

FIG. 4 illustrates a configuration diagram of a system employed in position detection of a plurality of terminals. For example, four terminals 103a, 103b, 103c, and 103d all have their positions detected in the present embodiment.

Figure 5:
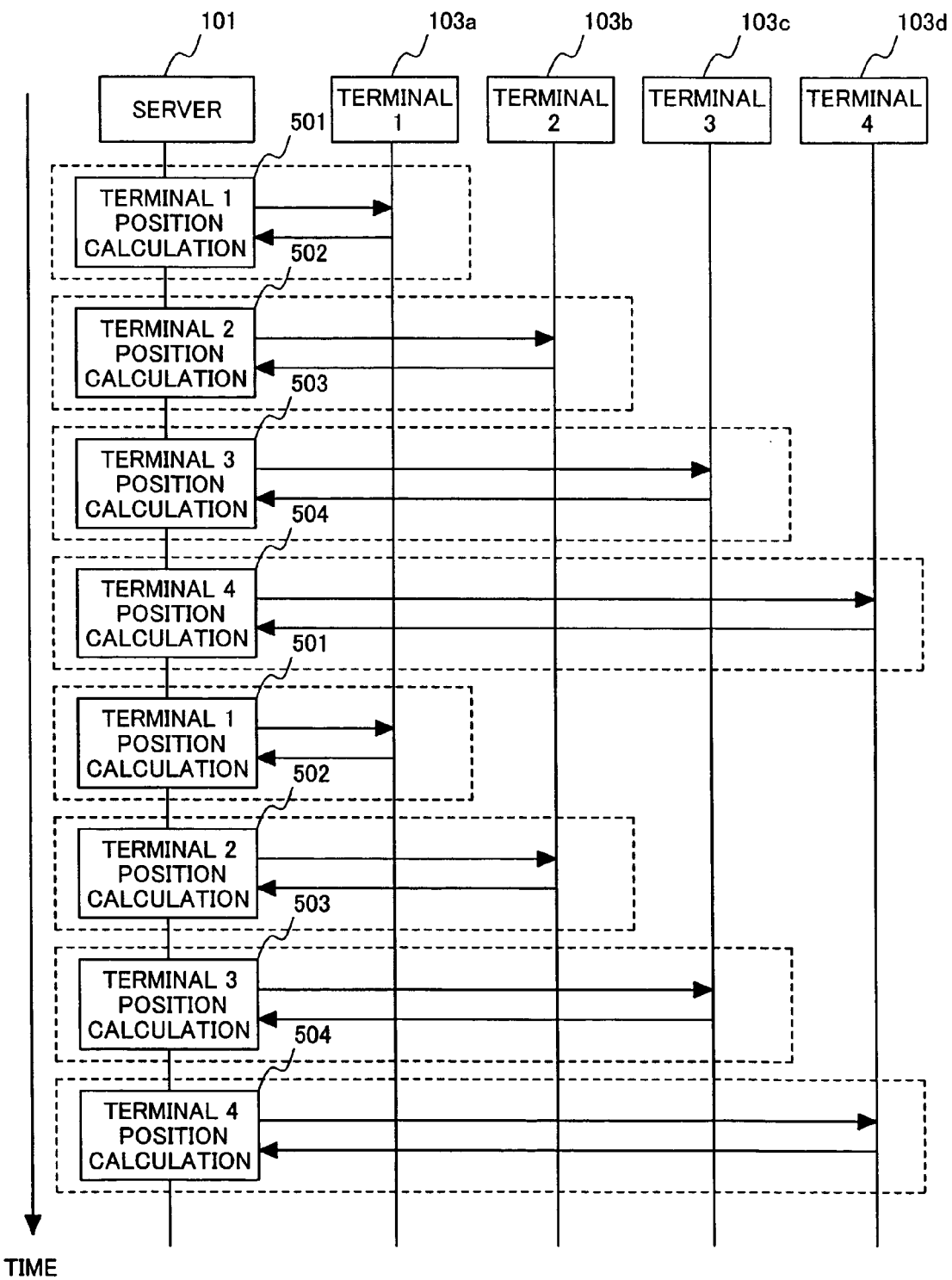
FIG. 5 is a control flow diagram of the position detection of the plurality of terminals.

FIG. 5 illustrates a control flow diagram of the position detection of the plurality of terminals. The simplest method of the position detection includes performing the control operations of the terminal 103a as shown in the flow diagram of FIG. 3 to calculate the position of the terminal 103a, and subsequently subjecting the same procedure to the terminals 103b, 103c, and 103d. This method has a problem in that the greater the number of terminals whose positions are to be detected, the longer the time required for the position detection in proportion to the number of the terminals.

Figure 6:
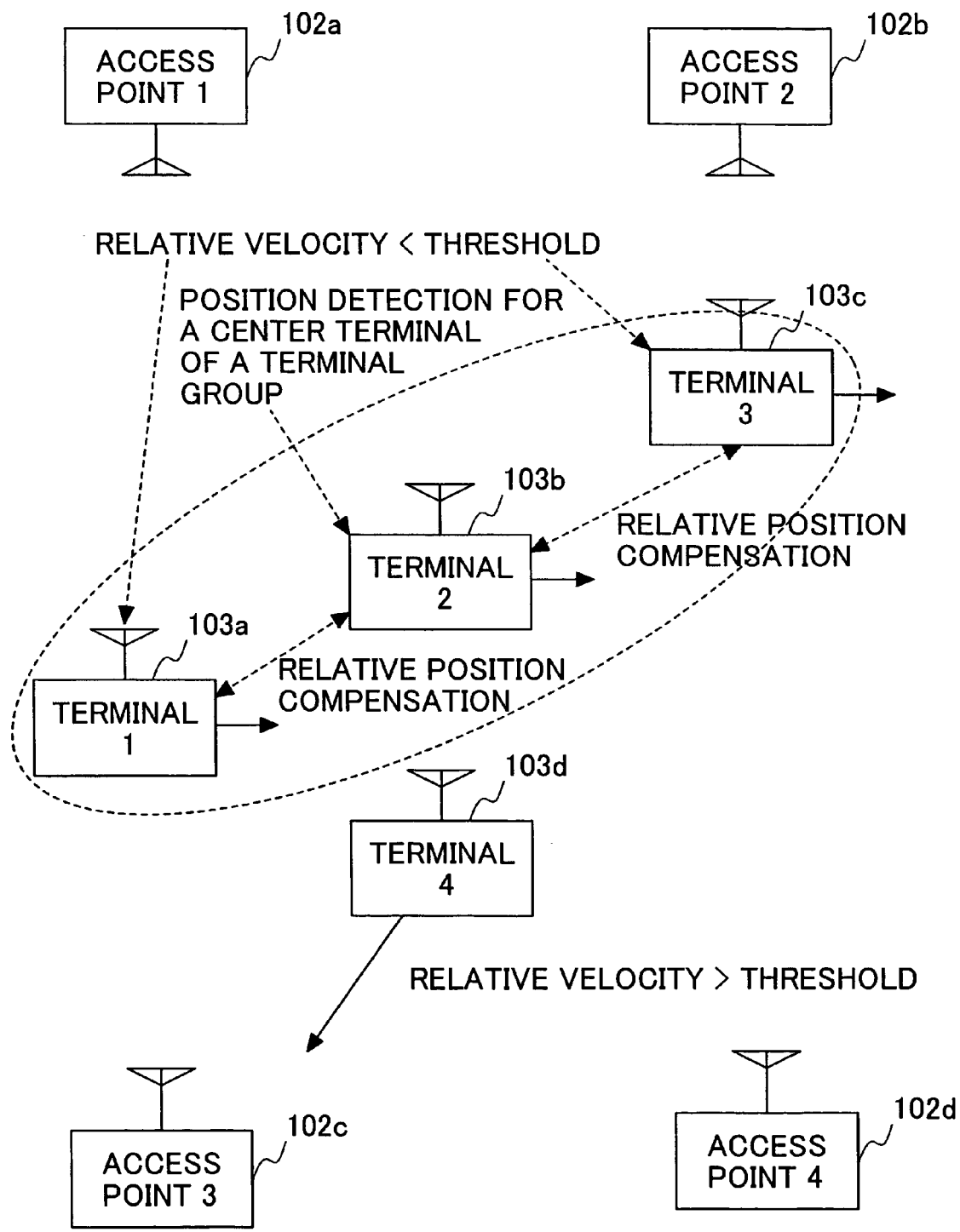
FIG. 6 is an explanatory diagram of the principle of a position detection method according to one preferred embodiment of the present invention.

FIG. 6 illustrates an explanatory diagram of the principle of a position detection method which comprises the step of grouping the terminals using the relative velocity thereof according to one preferred embodiment of the present invention. In this method, these terminals 103a, 103b, 103c, and 103d are classified into groups based on the relative velocities therebetween. In an example of FIG. 6, since the relative velocities among the terminals 103a, 103b, and 103c are equal to or less than a threshold value, these terminals are grouped together, i.e. classified as one group. The use of an algorithm determines the representative terminal of the group serving as the center of the group, as described later. If the terminal 103b is regarded as the representative terminal of the group, the representative terminal is only subjected to the procedure as shown in the flow diagram of the position measurement control to calculate the position thereof, while the remaining terminals 103a and 103c belonging to the group have their positions altered or corrected based on their relative positions with respect to the representative terminal 103b, whereby the positions of the terminals 103a and 103c are calculated and detected.

The coordinates of the terminal i (Xi, Yi, Zi) will be determined by the following equation (4), where x, y, and z represent the coordinate of the representative terminal, and Vxi, Vyi, and Vzi represent the relative velocity of the terminal i with respect to the representative terminal.

$$Xi = X + Xi0 + Vxi*t$$

$$Yi = Y + Yi0 + vyi*t$$

$$Zi = Z + Zi0 + Vzi*t \qquad (4)$$

The above (Xi0, Yi0, Zi0) represents the relative position of the terminal i viewed from the representative terminal on the previous position detection. The t represents the time interval between the time of the previous position calculation of the representative terminal and that of the present calculation thereof. The relative position (Xi, Yi, Zi) is to be updated by adding the relative movement distance (Vxi*t, Vyi*t, Vzi*t), which has been traveled since the previous measurement, every time the position detection is carried out.

Figure 7:
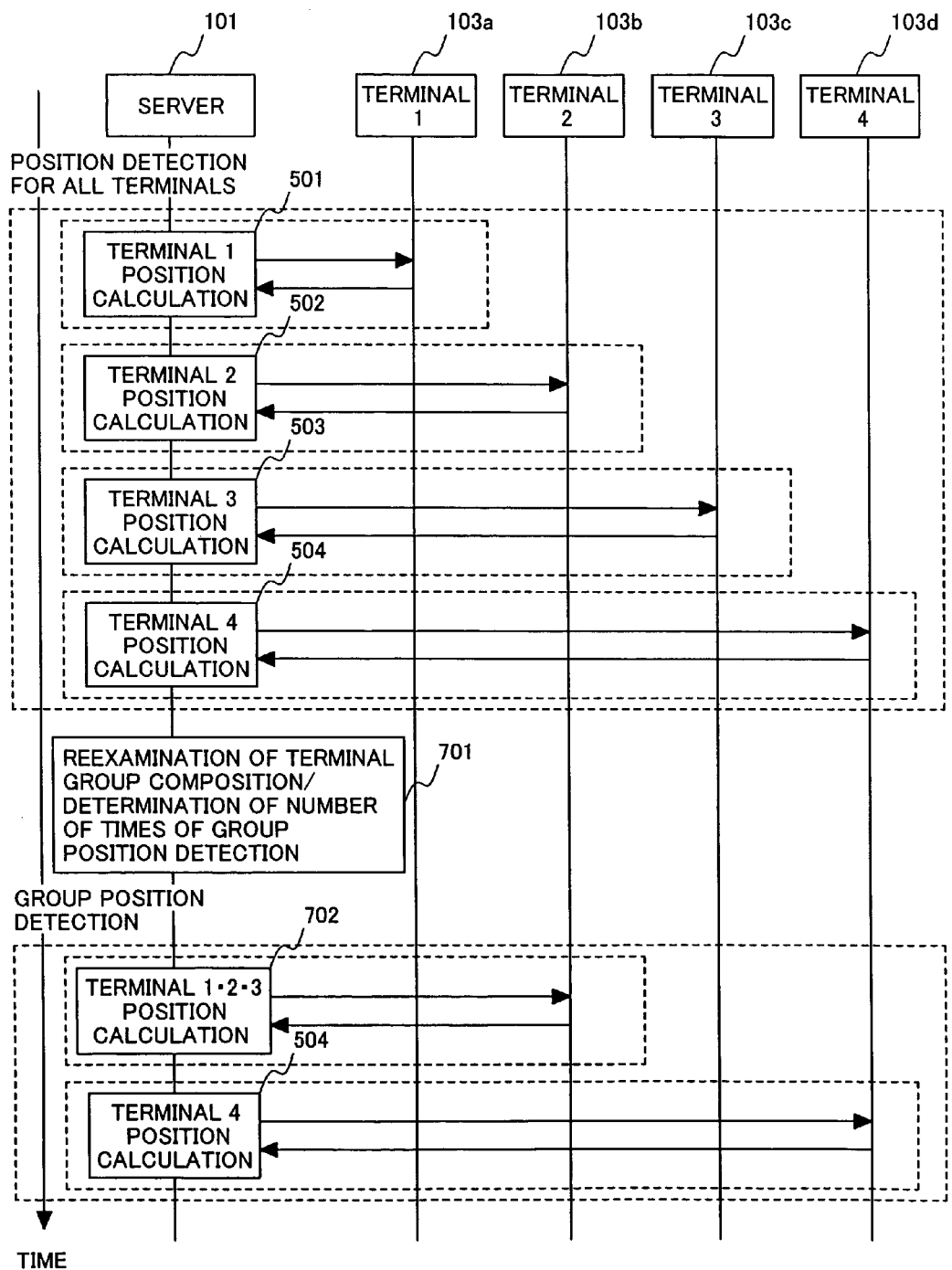
FIG. 7 is a control flow diagram of the position detection method according to the present embodiment.

FIG. 7 illustrates a flow diagram of control operations in the position detection according to the present embodiment. First, the positions of all terminals are calculated in accordance with the control operation flow diagram shown in FIG. 3 (which procedure is hereinafter referred to as "all-terminal position detection"). This procedure is repetitively or cyclically performed, and then a change in the terminal position is divided by the cycle to calculate the movement velocity of the terminal.

The determination of the terminal's velocities leads to determination of the relative velocities between the terminals. Reexamination of the terminal group composition which involves grouping the terminals based on the relative velocities thereof, and determination of the number of times of the group position detection, both of which are referred to as a procedure 701 in FIG. 7, is carried out. FIG. 7 shows an example in which the terminals 103a, 103b, and 103c are grouped together, and the terminal 103b is selected as the representative terminal.

Now, the position detection using information about the group (hereinafter referred to as "group position detection") will be described below in detail. First, the representative terminal 103b of the group has its position measured in accordance with the control operation flow diagram of FIG. 3, and the measured position of the representative terminal 103b is used to detect or determine the positions of the terminal 103a and 103c based on the above-mentioned equation (4). Since the terminal 103d does not belong to the group, the position of the terminal 103d is calculated in accordance with the control operation flow diagram shown in FIG. 3. The server may notify each terminal of a result of the position detection. Alternatively, the server may notify a device other than the terminals of the result.

The control operation of the group position detection is carried out in accordance with the control operation flow diagram the number of times requested as a result of the procedure 701 for determining the number of times of the group position detection. Thereafter, a procedure for detection of the relative velocity is carried out to calculate the positions of all terminals. Thus, the server repeatedly performs the all-terminal position detection and the group position detection in response to the position measurement request from the terminal or another device. Note that for convenience, in the present specification, the determination of the position of the representative terminal in the group position detection is hereinafter referred to as the position measurement, while the determination of the positions of other terminals using a relationship to the representative terminal's position determined by the position measurement is hereinafter referred to as the position detection.

Referring to FIG. 8, the effect of reduction in the time required for the position detection will be described by taking an example using numeric values. When it takes 0.2 seconds to calculate the position of one terminal by carrying out the control operation shown in the flow diagram of FIG. 3, it will take 80 seconds in total to determine the positions of four terminals one hundred times by the method which involves transmitting signals one by one for the position detection to the respective terminals. On the other hand, in the case of employing the present invention as shown in FIG. 7, the greater the number of times of the group position detection with respect to one time of the all-terminal position detection, the less the time required for the detection. For example, when three of four terminals can be grouped together, if the number of times of the group position detection is ten with respect to one time of the all-terminal position detection, then the detection time is 44 seconds. Thus, the detection time can be reduced to approximately 55% of the time needed in the conventional case. Even if the number of times of the group position detection is one, the time can be reduced to about 75%.

Figure 9:
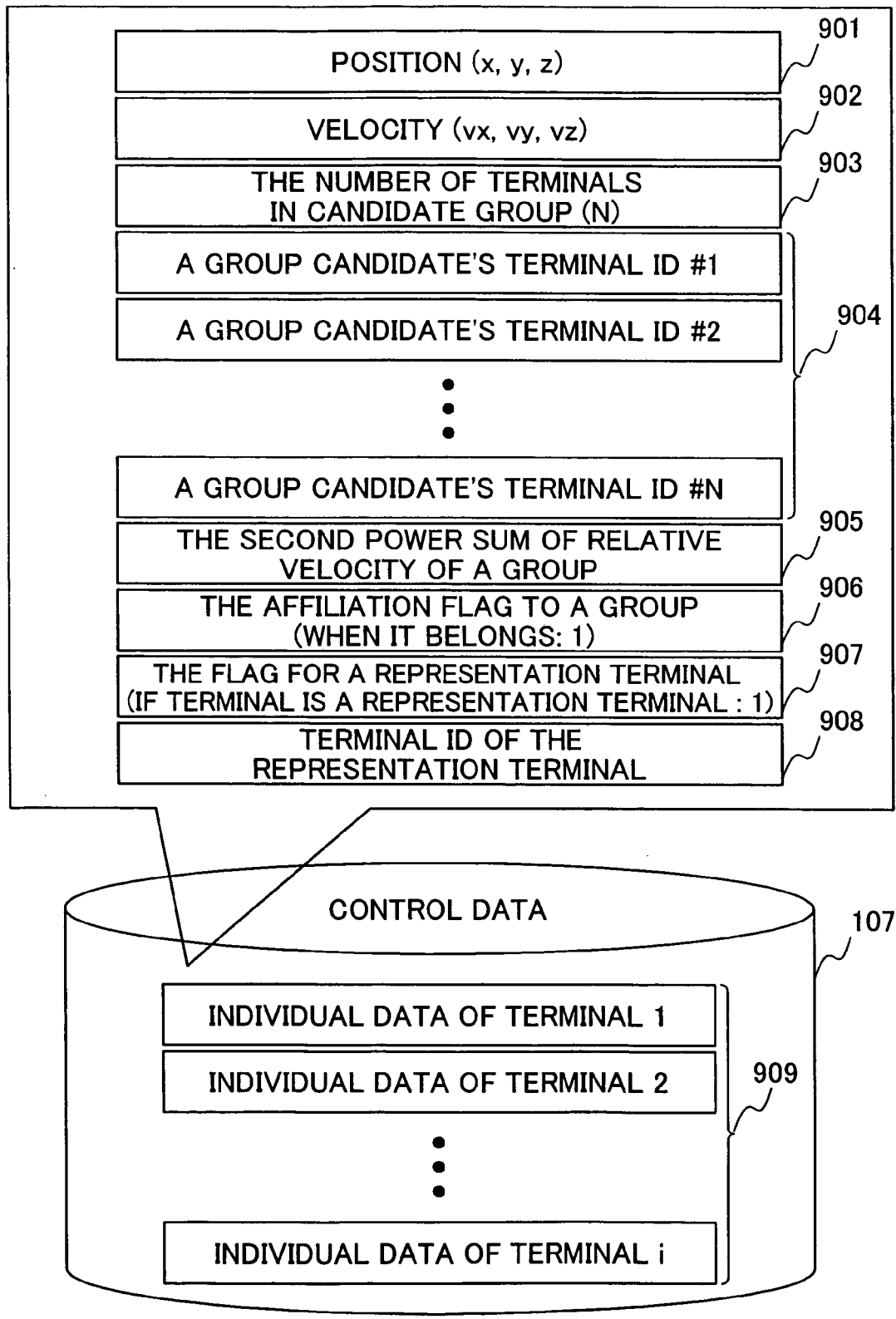
FIG. 9 is an explanatory diagram of control data stored in a server according to the present embodiment.

FIG. 9 illustrates an explanatory diagram of control data 107 of the server according to the present embodiment. Each terminal has its own individual data 909. Each terminal's individual data is composed of a terminal position (x, y, z) 901, a velocity of the terminal (vx, vy, vz) 902, the number of terminals 903 serving as a candidate for the group, an ID No. of the terminal 904 serving as a candidate for the group, a second power whole sum of relative velocities 905 between the terminals belonging to the group, a flag 906 representing whether the terminal belongs to the group, a flag 907 representing whether the terminal is a representative one or not when it belongs to the group, and a terminal ID of a representative terminal of the group 908 which the terminal of interest belongs to when it is not the representative one and belongs to the group.

Figure 10:
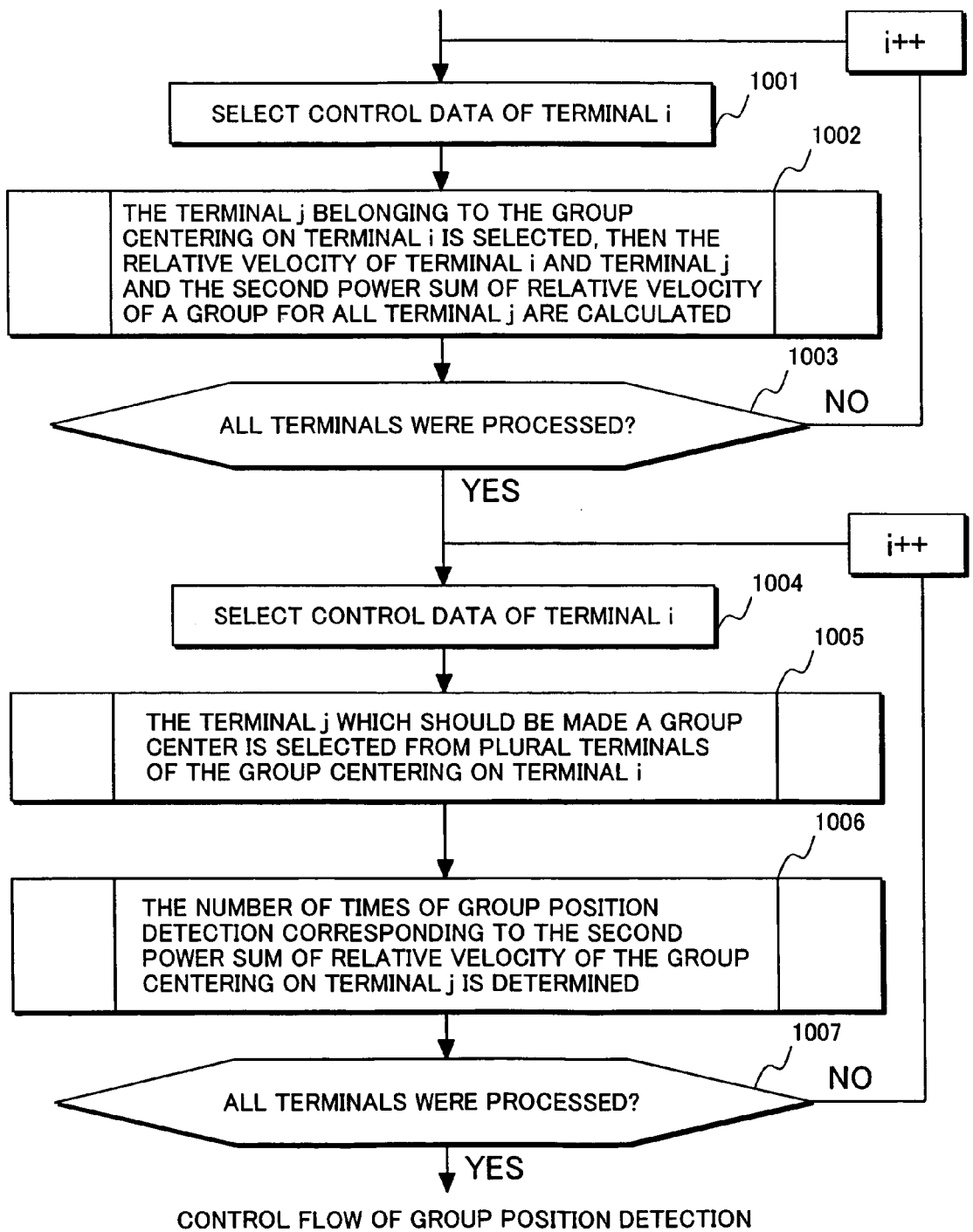
FIG. 10 is a flowchart showing detailed procedures of reexamination of a terminal group composition and determination of the number of times of group position detection performed by the server according to the present embodiment.

FIG. 10 illustrates a flowchart of the detailed procedure 701 including reexamination of the terminal group composition and determination of the number of times of the group position detection, which procedure is performed by the controller 105 of the server 101. Assuming that the all-terminal position detection is repeatedly performed at least twice, and that the positions and velocities of the terminals are determined by calculation to be included in the control data 107, the procedure 107 is carried out. It should be noted that twice or more times of the all-terminal position detection may mean twice or more times of the all-terminal position detection carried out just before one reexamination procedure 701 of the group composition. Alternatively, the twice or more times of the detection may mean the all-terminal position detection carried out at timing other than the timing of the group composition reexamination being performed, for example, at timing of the previous group composition reexamination or the like. It is desirable that a sufficient space to suitably identify the relative movement between the terminals be provided.

First, in order to select control data about one terminal i, a top address where the data is stored is obtained (step 1001).

Then, a terminal j located within a predetermined distance from the terminal i with the position of the terminal i centered is selected, and a relative velocity between the terminals i and j is determined. Thereafter, the second power of the respective relative velocities with respect to all the terminals j are summed up (step 1002).

If all the terminals are not subjected to the above-mentioned procedure of the step 1002, the operation returns to the step 1001. If not, the operation proceeds to a next step 1004 (step 1003).

Further, in order to select the control data for the terminal i, the top address where the data is stored is obtained (step 1004).

The terminal j which should be set primarily as the center of the group is selected from among a plurality of terminals belonging to the group centering on the terminal i (step 1005).

The number of times of the group position detection corresponding to the second power sum of relative velocities of the group centering on the terminal j is determined (step 1006).

If all the terminals are not subjected to procedures of the above-mentioned steps 1005 and 1006, the operation returns to the step 1004. If they are subjected to the above-mentioned procedures, the operation proceeds to a control operation step of the group position detection shown in the control operation flow diagram.

Figure 11:
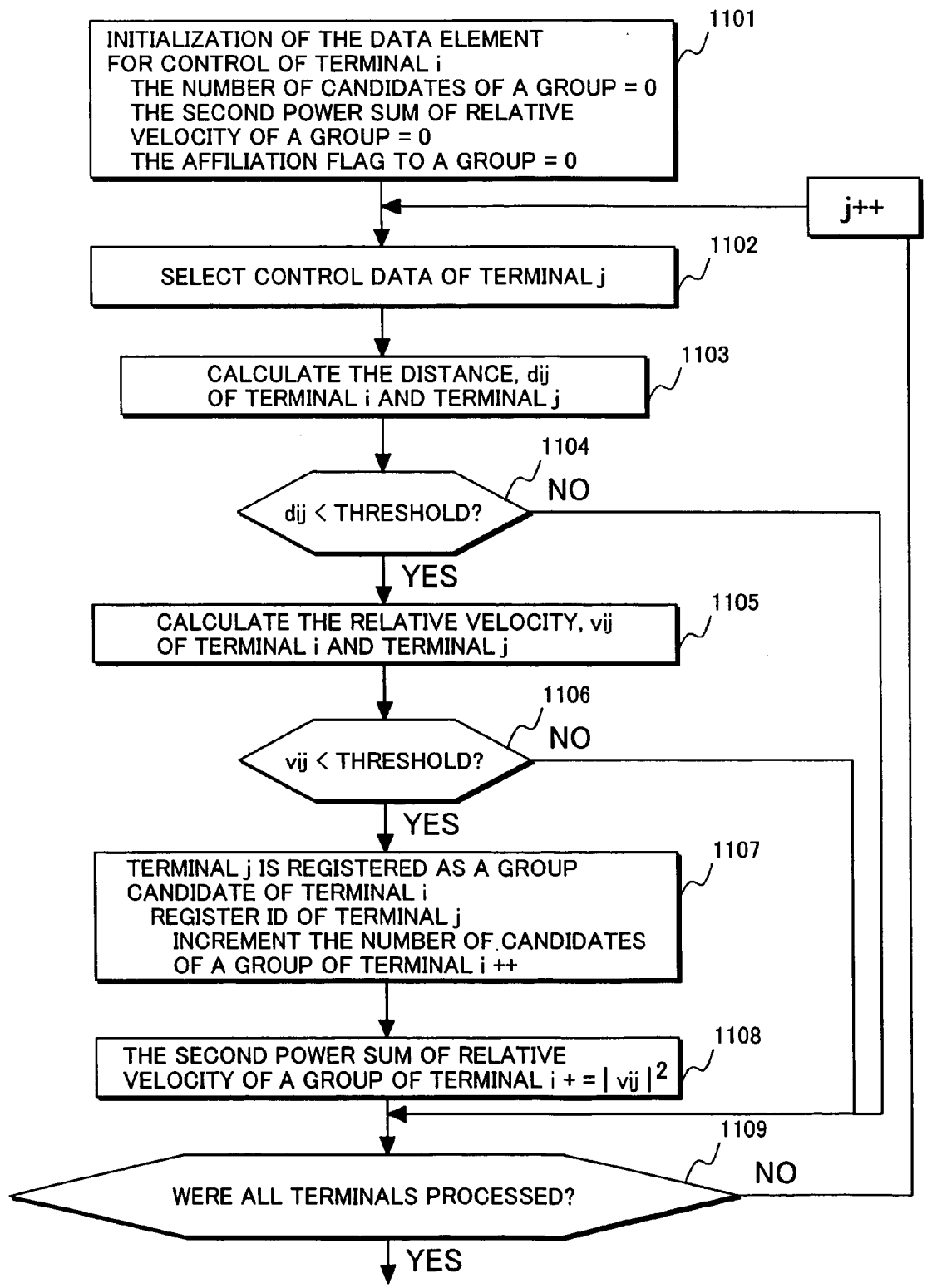
FIG. 11 is a detailed explanatory diagram showing a procedure for calculating the second power sum of relative velocities of a group in reexamination of the terminal group composition performed by the server according to the present embodiment.

FIG. 11 shows a detailed explanatory diagram of the procedure for calculating the second power sum of relative velocities of the group, which procedure is performed at the step 1002. First, a part of data elements for control of the terminal i is initialized (step 1101). More specifically, the number of candidates for the group 903, the second power sum of relative velocities of the group 905, and an affiliation flag to the group 906 are set to zero.

Then, in order to select control data about the terminal j other than the terminal i, a top address where the data is stored is obtained (step 1102).

A distance dij between the position (xi, yi, zi) of the terminal i 901 and the position (xj, yj, zj) of the terminal j 901 is determined based on the following equation (5) (step 1103).

$$dij=[(Xi-Xj)^2+(Yi-Yj)^2+(Zi-Zj)^2]^{1/2} \quad (5)$$

If the distance dij between the terminals i and j is equal to or less than a predetermined threshold value, the operation proceeds to a next step 1105. If not, the operation proceeds to a step 1109 as described later.

A relative velocity vij between the terminals i and j is determined using the velocity of the terminal i (vxi, vyi, vzi) 902 and the velocity of the terminal j (vxj, vyj, vzj) 902 by the following equation (6) (step 1105).

$$vij=[(vXi-vXj)^2+(vYi-vYj)^2+(vZi-vZj)^2]^{1/2} \quad (6)$$

If the relative velocity between the terminals i and j is equal to or less than a preset threshold value, these terminals are candidates for the group, and then the operation proceeds to a next step 1107. If not, the operation proceeds to the step 1109 as described later.

The terminal j is registered as the candidate for the group which the terminal i belong to (step 1107). More specifically, the ID of the terminal j is stored as the group candidate's terminal ID 904 in the control data for the terminal i, and the number of the candidates for the group 903 is increased by one.

The second power of the thus-obtained relative velocity vij is added to the second power sum of the group terminals 905 in the control data for the terminal i (step 1108).

If all terminals j other than the terminal i are not subjected to the above-mentioned procedures, the operation returns to the step 1102. If they are all subjected to the procedures, the procedure 1002 for determination of the second power sum of relative velocities between the terminals belonging to the group is completed.

Figure 12:
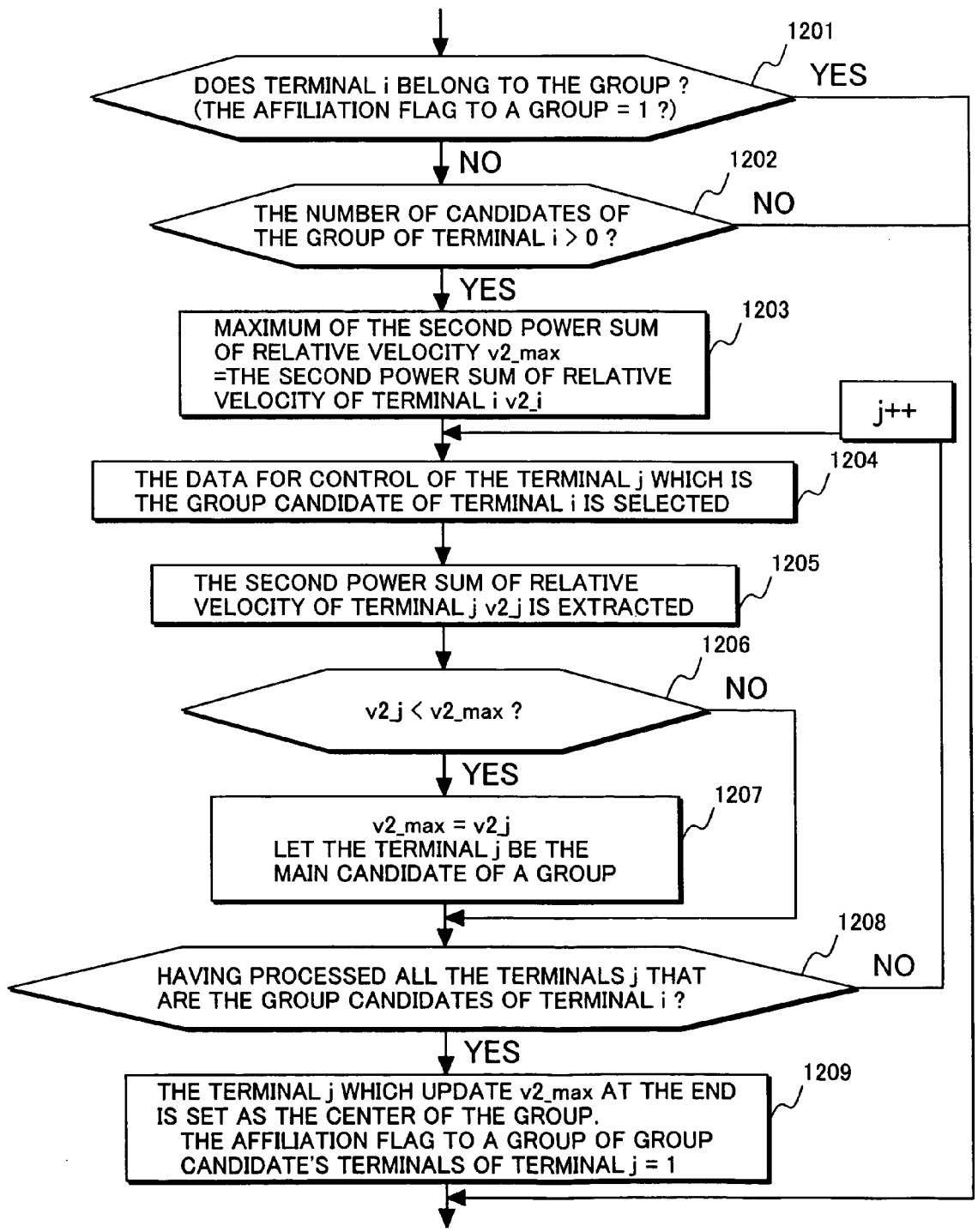
FIG. 12 is a detailed explanatory diagram showing a procedure for determining a terminal which should be set as the center of the group in reexamination of the terminal group composition performed by the server according to the present embodiment.

FIG. 12 illustrates a detailed explanatory diagram of the procedure for determining the terminal j which should be set as the center of the group at the step 1005. First, the affiliation flag 906 to the group in the control data for the terminal i is examined. If the flag 906 is not set to 1, the operation proceeds to a next step 1202 (step 1201). If the flag 906 is set to 1, since the terminal i has already belonged to any group, it is not necessary to determine the center of the group, and hence the procedure 1005 is completed.

Thereafter, if the number of the candidates for the group 903 included in the control data for the terminal i is equal to or more than zero, the operation proceeds to a next step 1203 (step 1202). If not, the terminal i does not have any candidates for the group located around the terminal i itself. Thus, it is not necessary to determine the center of the group, and then the affiliation flag to the group 906 and the representation flag 907 are set to zero, so that the procedure 1005 is completed without recording the terminal ID of the representative terminal 908 (terminal 103*d* in an example shown in FIG. 6).

The second power sum of the relative velocities of the group 905 in the control data for the terminal i is set as a maximum value of the second power sum of relative velocities v2_max (step 1203).

In order to select the terminal j from the group candidate's terminal IDs 904 registered in the control data for the terminal i and to select the control data for the selected terminal j, a top address where the data is stored is obtained (step 1204).

The second power sum of the relative velocities of the group 905 in the control data for the terminal j is set as v2_j (step 1205).

If the maximum value of the relative-velocity second power sum v2_max is larger than the above-mentioned v2_j, then the operation proceeds to a step S1207. If not, then the operation proceeds to a step 1208 as described later.

The v2_j is assigned to the new maximum value of the relative-velocity second power sum v2_max, so that the terminal j is regarded as the main candidate for the group (step 1207).

If all terminals included in the group candidate's terminal IDs 904, the number of which corresponds to the number of the group candidates 903 in the terminal i's control data, are subjected to the above-mentioned procedures, the operation proceeds to a step 1209. If not, the operation returns to the step 1204.

The terminal j which causes the maximum value of the relative-velocity second power sum v2_max to be last updated at the step 1207 is set as the center terminal of the group including the terminal i (step 1209). The group affiliation flag 906 in the control data for each of the terminals, which are designated as the group candidate's terminal IDs 904 included in the control data for the terminal i, is set to 1. The representation flag 907 of the terminal j (terminal 103*b* in the example of FIG. 6) is set to 1. Nothing is written in the representative terminal ID 908 in the control data for the terminal j. The representation flag 907 in the control data for each of the terminals (terminals 103*a* and 103*c* in the example of FIG. 6) other than the terminal j and belonging to the group is set to 0, and the representative terminal ID therein is designated as the terminal j, so that the fact that the terminals other than the terminal j belong to the group centering on the terminal j is recorded.

FIG. 13 is an explanatory diagram illustrating a method for determining the number of times of the group position detection at the above-mentioned step 1006. The more similar the movements of the terminals belonging to the group, the higher the accuracy of position detection expected when carrying out the group position detection, and it is not necessary to frequently reexamine the group composition, leading to the effective position detection. That is, when the degree of relative movement between the terminals belonging to the group is small, setting the large number of times of the group position detection N, which is successively performed without reexamination of the group composition, enables the position detection of the terminal with high accuracy. The number N can be expressed as a function f(v2_j) of the v2_j, where N represents the number of times of the group position detection, and v2_j represents the second power sum of relative velocities of the center terminal j of the group with respect to the other terminals. The following equation (7) is taken as an example of the function.

$$f(v2\_j) = [k/v2\_j] \qquad (7)$$

The above k is a constant, and the [x] means an integer that does not exceed the value x.

Alternatively, a table 1301 for retrieving the number of times of group position detection may be prepared in advance, so that the number of times of group position detection may be uniquely determined depending on a range assigned to the second power sum v2_j of relative velocities of the terminal i with respect to the other terminals.

Figure 14:
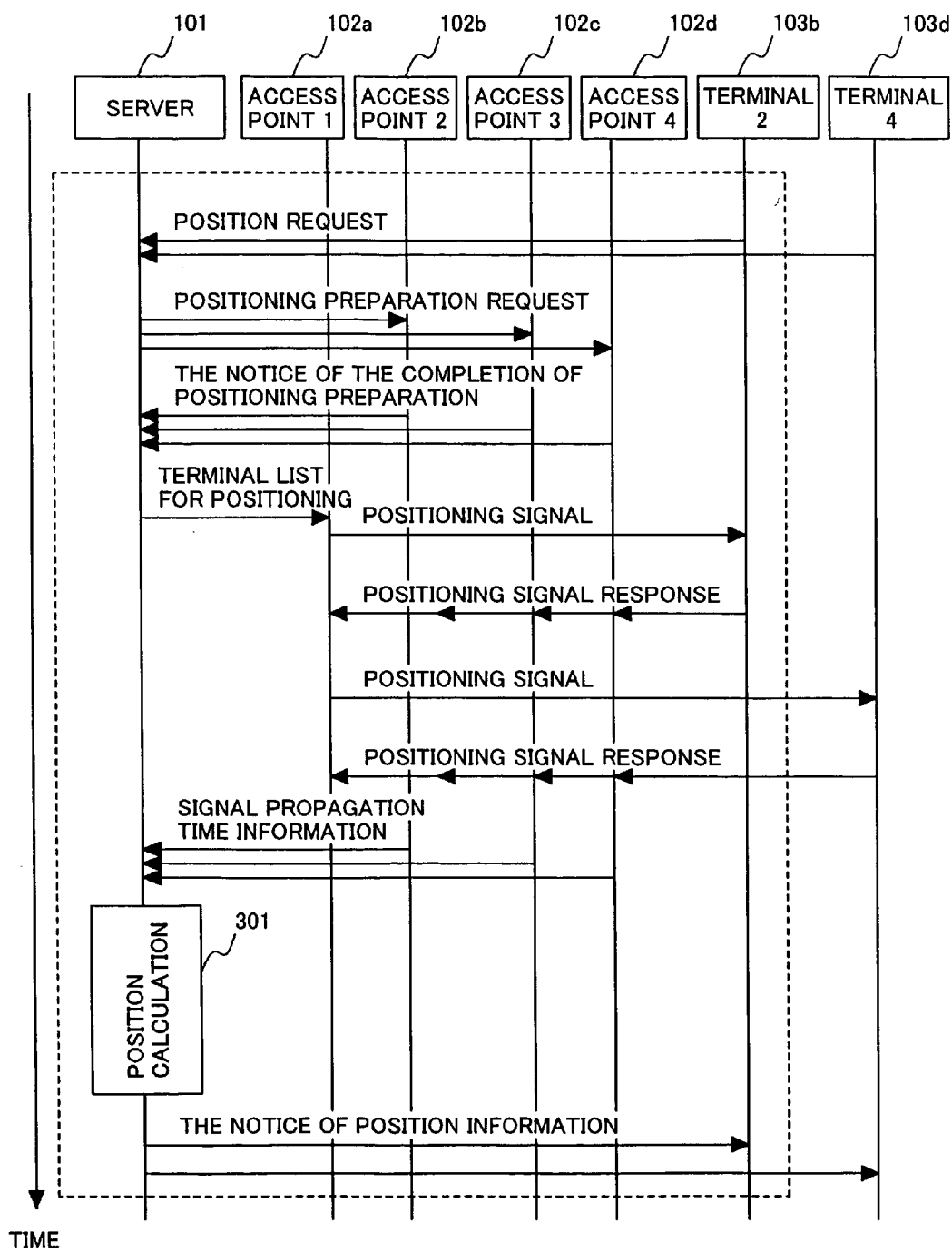
FIG. 14 is a control flow diagram showing a position detection method according to another preferred embodiment of the present invention.

FIG. 14 illustrates an explanatory flow diagram of control operations in position detection according to another preferred embodiment. In this embodiment, the terminals 103*b* and 103*d* are dependent on the access point 102*a*. The access point 102*a* has already informed the server 101 that the terminals 103*b* and 103*d* are dependent on the access point 102*a* itself.

First, when position requests are sent from the terminals 103*b* and 103*d* to the server 101, the server 101 receives them all at once. Alternatively, the server 101 may receive position requests of the terminals 103*b* and 103*d* or of terminals 103*a* to 103*d* from a device other than the terminal. When receiving the position requests of the terminals 103*a* to 103*d*, the server determines which one of the terminals 103*a* to 103*d* is subjected to the position measurement procedure using the positioning signal with reference to the control data 107. More specifically, the affiliation flags 906 and representation flags 907 for the terminals 103*a* to 103*d* are referred to. Since the terminal having the affiliation flag of 0 does not belong to the group, the terminal is subjected to the position measurement procedure using the positioning signal. Since the terminal having both of the affiliation and representation flags of 1 is the representative terminal, the terminal is subjected to the position measurement procedure using the positioning signal.

Then, the server 101 examines whether the access point on which the terminals 103*b* and 103*d* are dependent is the access point 102*a* or not. If so, the server notifies the terminals 102*b*, 102*c*, and 102*d* located around the access point 102*a* of the positioning preparation requests including information about a frequency channel of the access point 102*a*.

The access points 102b, 102c, and 102d shift their own frequency channels to that of the access point 102a which is described in the positioning preparation requests, and then give the notices of completion of the positioning preparation to the server.

In receiving the notices of completion of the positioning preparation, the server generates a list of the terminals 103b and 103d that are to be subjected to the positioning all at once, and then notifies the point 102a of the positioning list.

The access point 102a first sends the positioning signal to the terminal 103b in order presented in the measurement list, and thereafter the terminal 103b sends back the positioning signal response to the access point 102a. Subsequently, the access point 102a sends the positioning signal to the terminal 103d, and then the terminal 103d sends back the positioning signal response to the point 102a.

The access points 102b, 102c, and 102d notify the server 101 of the reception times and the received signals of these positioning signals and positioning signal responses serving as signal-propagation time information.

The server 101 solves the simultaneous equations composed of the above-mentioned equations (1) to (3) to calculate the positions of the terminals. The thus-obtained coordinates of the positions are notified the terminals 103b and 103d as the positional information. In order to detect the positions of the terminals 103a and 103c, the representative terminal of the group which these terminals belong to is specified with reference to the representative terminal ID 908 in the control data 107 of each individual terminal. The position of the thus-specified representative terminal is used to calculate the positions of the terminals by means of the above-mentioned equation (4).

According to this method, the requests for the positioning preparation of a plurality of terminals can be sent to the access points 102b, 102c, and 102d all at once, permitting reduction in overhead caused by a control protocol and in the position detection time.

This method may be applied to the all-terminal position detection and the group position detection, both of which have been described in FIG. 7, thus reducing the position detection time. In a case where a plurality of representative terminals of groups are dependent on one access point, a measurement list including these group representative terminals as a whole may be notified to achieve the group position detection.

Although, in the present embodiments as described above, trilateration using information about differences in propagation times of the signals is employed, the principle and method of position detection of the representative terminal of the group or the terminal not belonging to the group are not limited thereto. Any position measurement method using radio signals may be employed.

Although the server makes determination of the group composition in the embodiments, one or more terminals may have the same function as that of the above-mentioned server additionally.

When the relative velocity between the terminals is previously found to be approximately zero, only the representative terminal may be subjected to position measurement, and the positions of remaining terminals may be estimated by the relationship between the relative positions.

When the relative velocity between the terminals is previously found to be zero, the terminal other than the representative terminal is regularly subjected to the position detection procedure to estimate the position of the representative terminal based on the relative positional relationship from positional information obtained. Averaging the estimated position and the detected position of the representative terminal can improve the accuracy of position detection of the representative terminal.

What is claimed is:

1. A position detection method in a terminal position detection system, the detection system including a plurality of terminals, a plurality of access points capable of conducting radio communications with said terminals, and server equipment connected to said plurality of access points via a network, said server equipment being adapted to perform a position measurement procedure for measuring a position of the terminal using a signal transmitted/received between said terminal and one of said plurality of access points, the method comprising the steps of:
   in the case of repetitively performing a position detection procedure, performing a group composition determination procedure which involves determining whether two or more terminals should be classified as belonging to a same group based on detected positional information for said plurality of terminals;
   selecting at least one terminal from the terminals belonging to the same group as a representative terminal of the group;
   performing said position measurement procedure of the selected representative terminal; and
   estimating the position of the terminal other than the representative terminal and belonging to the same group using a relative velocity thereof to said representative terminal so as to detect the position of the terminal, thereby performing a group position detection procedure.

2. The position detection method according to claim 1, wherein the determination of the two or more terminals classified as belonging to the same group is performed based on the relative velocity between said two or more terminals.

3. The position detection method according to claim 1, wherein said position measurement procedure is performed based on trilateration which uses differences in propagation times of the signal transmitted/received between said one access point and the terminal.

4. The position detection method according to claim 3, wherein said one access point transmits/receives the signal for measuring said signal propagation time difference only to/from said representative terminal.

5. The position detection method according to claim 1, wherein said one or more group position detection procedures and said group composition determination procedure are repeatedly performed, and wherein the number of the group position detection procedures to be performed before performing another group composition determination procedure again is determined based on the relative velocity of the terminal belonging to the group.

6. The position detection method according to claim 1, wherein said representative terminal of the group is determined based on the relative velocity between the terminals belonging to the group.

7. The position detection method according to claim 1, further comprising, when the relative velocity between the terminals belonging to the same group is previously found to be zero, regularly performing the position detection of the terminal other than the representative terminal to estimate the position of the representative terminal based on a relative positional relationship from positional information obtained, and averaging the estimated position and the detected position of the representative terminal to determine the position of the representative terminal.

8. A position detection method in a terminal position detection system, the detection system including a terminal, a plurality of access points capable of conducting radio communications with the terminal, and server equipment connected to said plurality of access points via a network, the method comprising the steps of:
when performing position detection of a plurality of terminals which are connected to a same access point, receiving requests for the position detection of the plurality of terminals at the server equipment;
notifying a list of the terminals whose positions are to be detected as a whole, to the access point to which the plurality of terminals belong, from the server equipment;
making positioning preparations of said terminals of interest for position detection as a group;
transmitting and receiving the signals for the position detection to and from said access point successively in accordance with the terminal list;
receiving the signal transmitted/received between said terminal and one of said plurality of access points, at a plurality of access points other than said one access point;
collecting information about reception timing of the received signal at each of the other access points with the server equipment;
calculating the position of the terminal using the plurality of pieces of information about the reception timing and positional information about the other access points;
in the case of repetitively performing a position detection procedure, determining a movement velocity of the terminal from a series of the detected positional information about the terminal;
examining a relative velocity between the terminals based on said terminal movement velocity;
classifying the terminals with low relative velocities therebetween as belonging to a same group;
selecting at least one of the terminals belonging to the same group as a representative terminal of the group;
transmitting a list of the representative terminal of interest for the position detection from the representative terminal or the terminal which does not belong to the group to the one access point on which the plurality of terminals are dependent;
transmitting and receiving the signals for the position detection between the access point and said representative terminal or other terminal not belonging to the group in accordance with the list; and
estimating the position of the terminal other than the representative terminal and belonging to the group using the relative velocity thereof to the representative terminal, thereby detecting the position of the terminal.

9. Server equipment connected to a plurality of access points capable of conducting radio communications with a plurality of terminals via a network, comprising:
a communication interface for reception of measurement data about a signal transmitted/received between at least one of said plurality of terminals and said access point;
a position measurement database for accumulating therein the received measurement data; and
a processing unit for performing position detection of said plurality of terminals,
wherein said processing unit is adapted to classify at least part of the plurality of terminals as belonging to the same group, to perform a position measurement procedure of a representative terminal of the group based on the measurement data about the signals transmitted/received between the plurality of access points and the representative terminal, and to measure the position of the terminal other than the representative terminal and belonging to the same group using a relative velocity thereof to said representative terminal so as to detect the position of the terminal, thereby performing a group position detection procedure.

10. The server equipment according to claim 9, wherein said processing unit performs a group composition determination procedure which involves determining whether two or more terminals should be classified as belonging to the same group based on positional information about said plurality of terminals or on information about the relative velocity.

11. The server equipment according to claim 9, wherein said communication interface receives data concerning differences in propagation times of a positioning signal as said measurement data, the positioning signal having been transmitted/received between said access point and the terminal, and wherein said processing unit measures the position of the terminal by trilateration which uses said signal propagation time differences.

12. The server equipment according to claim 11, wherein said processing unit controls said plurality of access points in such a manner that the positioning signal is transmitted/received between the access points and only the representative terminal among the plurality of terminals belonging to the group.

13. The server equipment according to claim 10, wherein said processing unit repeatedly performs said one or more group position detection procedures and said group composition determination procedure, and determines the number of the group position detection procedures to be performed before performing another group composition determination procedure again, based on the relative velocity of the terminal belonging to the group.

14. The server equipment according to claim 10, wherein the representative terminal of the group is determined based on the relative velocity between the terminals belonging to the group.

15. The server equipment according to claim 9, wherein, when the relative velocity between the terminals belonging to the same group is previously found to be zero, the processing unit regularly performs the position detection of the terminal other than the representative terminal, estimates the position of the representative terminal based on a relative positional relationship from positional information obtained, and averages the estimated position and the detected position of the representative terminal to determine the position of the representative terminal.

16. The server equipment according to claim 11, wherein said processing unit receives requests for the position detection of the plurality of terminals, and notifies the access point on which said plurality of terminals are dependent, of a list of the terminals whose positions are to be detected as a whole so as to make positioning preparations of said terminals of interest for the position detection all at once.

* * * * *